United States Patent [19]

McMaster et al.

[11] 4,048,000
[45] Sept. 13, 1977

[54] PROCESS FOR PROVIDING IMPROVED HEAD POINTS IN CONCRETE BLOCK CONSTRUCTION WITH LATEX-EPOXY-CEMENT ADHESIVE

[75] Inventors: Elmer L. McMaster; Dallas G. Grenley, both of Midland; Elton D. Prueter, Saginaw, all of Mich.

[73] Assignee: The Dow Chemical Company, Midland, Mich.

[21] Appl. No.: 614,729

[22] Filed: Sept. 18, 1975

Related U.S. Application Data

[63] Continuation of Ser. No. 492,566, July 29, 1974, abandoned, which is a continuation-in-part of Ser. No. 295,374, Oct. 5, 1972, abandoned.

[51] Int. Cl.$^2$ ............................ C08K 3/34; C09J 3/16
[52] U.S. Cl. .................................... 156/304; 156/330; 260/18 N; 260/29.2 EP; 260/29.7 S; 260/29.7 NR; 260/42.13; 260/42.28
[58] Field of Search ................... 260/29.2 EP, 20.7 S; 156/330, 304

[56] References Cited

U.S. PATENT DOCUMENTS

| | | | |
|---|---|---|---|
| 2,899,397 | 8/1959 | Aelony et al. | 260/18 PN |
| 2,933,409 | 4/1960 | Binkley et al. | 260/29.2 EP |
| 3,211,675 | 10/1965 | Johnson | 260/37 EP |
| 3,240,736 | 3/1966 | Beckwith | 260/39 R |
| 3,437,619 | 4/1969 | Nutt et al. | 260/30.8 |

*Primary Examiner*—Murray Tillman
*Assistant Examiner*—Arthur H. Koeckert
*Attorney, Agent, or Firm*—Ronald G. Brookens

[57] ABSTRACT

Process for providing improved head joints in concrete block construction comprising utilizing as the adhesive in the preparation of such head joints a plastic aqueous binder composition comprising a mixture of a hydraulic cement, a polymeric latex and a liquid synthetic thermosetting ambient temperature curable epoxide resin, and a polyamide curing agent therefor, wherein the binder composition is prepared by (1) preparing a first mixture of cement and thermosetting resin which first mixture is mixed on a compounding mill under conditions of high shear, (2) preparing a second mixture comprising a blend of the polymeric latex with the curing agent wherein the curing agent is dissolved in methyl alcohol, and (3) admixing the first and second mixtures prior to use as an adhesive.

3 Claims, No Drawings

PROCESS FOR PROVIDING IMPROVED HEAD POINTS IN CONCRETE BLOCK CONSTRUCTION WITH LATEX-EPOXY-CEMENT ADHESIVE

This application is a continuation of application Ser. No. 492,566, filed July 29, 1974, now abandoned which in turn is a continuation-in-part of application Ser. No. 295,374, filed Oct. 5, 1972, now abandoned.

BACKGROUND OF THE INVENTION

Binder or "mortar" compositions of the type contemplated by the present invention are broadly disclosed in U.S. Pat. No. 3,240,736. The prior known methods for preparing such compositions comprise preparation of a mixture of (a) cement, plasticizer (i.e., latex) and water and a separate mixture of (b) resin and curing agent, followed by prompt admixing of the separately formed mixes. Such process requires that the ingredients of the binder composition be supplied to the user as a four-package system, i.e., individual packages of cement, plasticizer, resin and curing agent. Heretofore, these ingredients could not be premixed and stored without adversely affecting the binder properties. It is the primary object of the present invention to provide a means of forming such binder compositions wherein the ingredients thereof may be premixed and supplied to the user as a two-package system without detriment to binder effectiveness.

SUMMARY OF THE INVENTION

The above and related objects are attained using the ingredients of the binder compositions as disclosed by U.S. Pat. No. 3,240,736 and forming such compositions by a process consisting of (1) separately preparing a first mixture comprising a blend of cement and resin and a second mixture comprising a blend of latex plasticizer with resin curing agent dissolved in an aliphatic alcohol, and (2) subsequently admixing such mixtures.

DESCRIPTION OF THE PREFERRED EMBODIMENTS

The ingredients of the binder compositions used in the process of the present invention are as broadly disclosed in U.S. Pat. No. 3,240,736, issued Mar. 15, 1966. More particularly, such compositions comprise a mixture (in parts by weight of solids) of from about 20 to about 85 hydraulic cement; from about 2 to about 25 polymeric latex plasticizer for the composition of the group consisting of rubbers and synthetic thermoplastic resins; from about 10 to about 50 liquid synthetic thermosetting ambient temperature curable resin selected from the group consisting of epoxide, polyurethane, polyester and silicone and as a curing agent therefor a polyamide resin, such as those derived from polymeric fat acids and aliphatic polyamines, preferably having an amine value of 290–320; wherein the resin is from about 60 to about 95 percent by weight and the curing agent is the remainder; together with water for curing said cement. The present invention pertains to a novel means of combining such ingredients to permit supplying to the user a two-package system which can be premixed and conveniently stored for extended periods of time, and which is characterized by an exceptionally smooth consistency with accompanying case of application, e.g. as head joints in concrete block construction.

As indicated supra, the process disclosed herein contemplates preparing a first mixture comprising a blend of cement and resin and a second mixture comprising latex plasticizer and resin curing agent.

The blend of cement and resin is conveniently prepared by slurrying the prescribed ingredients in suitably inert material such as acetone, methylene chloride, benzene, toluene, o-dichlorobenzene, methyl ethyl ketone, ethylene glycol, and the like. The cement and resin may also be advantageously blended in the presence of small amounts of plastifying materials, e.g. dibutylphthalate to achieve desired viscosity characteristics and ultimate strength. Further, it has been discovered that such blends are advantageously prepared by means of high shear mixing such as by use of a compounding mill. Use of such high shear mixing tends to produce an ultimate composition characterized by improved shelf-life and an exceptionally smooth consistency, with accompanying ease of application of binder, e.g., during the construction of concrete block walls. Further, such mixture does not stiffen excessively even after standing for up to one year at normal room temperatures.

It has further been discovered that binder compositions having enhanced shelf-life and "working-life" are obtained by utilization of a mixture of latex plasticizer with a resin curing agent dissolved in an aliphatic alcohol, preferably methanol, particularly where the alcohol is present in amount of from about 0.25 to 1 part alcohol per part of curing agent. The herein prescribed mixture of latex and resin curing agent have been found to have an effective shelf-life of at least 12 months and is unaffected by 24 freeze/thaw cycles.

Thus, the separately prepared blends may be stored or packaged for extended periods without adverse effect upon binder properties. The advantages of such process include a lower cost packaging system. The blends further provide convenience in the use at the ultimate job site as contrasted to attempting to uniformly distribute a solid (cement) throughout a viscous mass of resin by the methods of prior art.

The following nonlimiting examples, wherein all parts and percentages are by weight unless indicated otherwise, illustrate the present invention.

EXAMPLE 1

To 51.9 grams of portland cement was added a solution of 11.8 grams of an epoxy resin (comprising 100 parts of a diglycidyl ether of a polyhydric alcohol having an equivalent weight of from about 232 to 250 and containing 20 parts of the plasticizer dibutyl phthalate) in 11.8 grams of acetone (Mixture 1).

Thereafter, 28.4 grams of a butadiene-styrene latex containing about 15 percent latex solids were added with gentle mixing to 7.9 grams of a polyamide curing agent (having an amine value of 290–320) dissolved in 7.9 grams of methyl alcohol (Mixture 2).

Mixtures 1 and 2 were subsequently admixed and applied to individual concrete substrates which were cut from patio blocks having dimensions of 1⅝ × 7⅝ × 15⅝ inches, to produce minibeam test specimens. These test specimens (1⅝ × 1⅝ × 7⅝ inches) were bonded end to end and tested on an Instron Tester for flexural strength by center point loading. Tensile strength was determined on wedges cut from similar concrete substrates with the small end of the wedges (1⅝ × 1⅝ inches) bonded together and tested for tensile adhesion. The following Table I provides testing results.

TABLE I

| Cure Days at 75° F. | Days Immersed in Water[a] | Minibeam P.S.I.[b] Dry | Minibeam P.S.I.[b] Wet | Tensile Wedge, P.S.I.[b] Dry | Tensile Wedge, P.S.I.[b] Wet |
|---|---|---|---|---|---|
| 22 | 4 | 807 | 570 | 297 | 246 |
| 22 | 4 | 699 | 430 | 250 | 239 |
| 22 | 4 | 594 | 374 | 235 | 172 |

[a]Days test specimens immersed in water at room temperature following dry cure. Specimens tested in the wet state.
[b]All test specimens failed 100% in the block.

EXAMPLE 2

To 208 grams of portland cement was added 48 grams of epoxy resin of Example 1 dissolved in 8 grams of acetone (Mixture 1). Thereafter, 114 grams of the latex of Example 1 were added to 32 grams of the curing agent of Example 1 dissolved in 32 grams of methyl alcohol (Mixture 2).

Mixture 1 was then admixed with Mixture 2. Test beams were made of concrete blocks (8 × 8 × 16 inches) bonded end to end and tested with the block cores and adhesive beads perpendicular to the direction of force application. The following Table II illustrates the results obtained.

TABLE II

| Days Cure at 73° F. | Load, Lbs. | Stress, P.S.I. | Tensile Bead Failure, % |
|---|---|---|---|
| 3 | 2450 | 285 | 100 Bond |
| 3 | 2660 | 310 | 100 Bond |
| 3 | 2380 | 277 | 100 Bond |
| 10 | 3815 | 444 | 100 Block |
| 10 | 3815 | 444 | 100 Block |
| 10 | 2730 | 318 | 100 Bond |

EXAMPLE 3

To 104 grams of portland cement was added 24 grams of the epoxy resin of Example 1 dissolved in 4 grams of acetone (Mixture 1). Thereafter, 56.8 grams of latex of Example 1 were added to 16 grams of the curing agent of Example 1 dissolved in 16 grams of methyl alcohol (Mixture 2). Mixtures 1 and 2 were stored at about 75° F. for 5 months, then admixed and tested as per Example 1. The following Table III illustrates the results obtained:

TABLE III

| Days Cure at 73° F. | Additional Days Immersed in Water | Minibeams P.S.I. Dry | Minibeams P.S.I. Wet | Tensile Wedge P.S.I. Dry | Tensile Wedge P.S.I. Wet |
|---|---|---|---|---|---|
| 6 | — | 671 | — | 364 | — |
| 6 | — | 636 | — | 314 | — |
| 6 | — | 594 | — | 195 | — |
| 75 | 3 | — | 492 | — | 150 |
| 75 | 3 | — | 339 | — | 119 |

All samples failed 100% in the block.

EXAMPLE 4

To 51.9 grams of portland cement was added 11.8 grams of the epoxy resin of Example 1 dissolved in 3 grams of methylene chloride (Mixture 1). Thereafter, 28.4 grams of the latex of Example 1 were added to 7.9 grams of the curing agent of Example 1 dissolved in 7.9 grams of methyl alcohol (Mixture 2). Mixtures 1 and 2 were then admixed and tested as per Example 1. Table IV illustrates the results obtained.

TABLE IV

| Days Cure at 73° F. | Additional Days Immersed in Water | Minibeams -P.S.I. Dry | Minibeams -P.S.I. Wet | Tensile Wedge P.S.I. Dry | Tensile Wedge P.S.I. Wet |
|---|---|---|---|---|---|
| 14 | — | 546 | — | 337 | — |
| 14 | — | 717 | — | 239 | — |
| 14 | — | — | — | 214 | — |
| 10 | 4 | — | 402 | — | 206 |
| 10 | 4 | — | 430 | — | 123 |
| 10 | 4 | — | 367 | — | 106 |

All test specimens failed 100% in the block.

EXAMPLE 5

To 208 grams of portland cement was added 48 grams of the epoxy resin of Example 1 dissolved in methylene chloride (Mixture 1). Thereafter, 114 grams of the latex of Example 1 were added to 32 grams of the curing agent of Example 1 dissolved in 32 grams of methyl alcohol (Mixture 2). Mixtures 1 and 2 were admixed and tested as per Example 2. The following Table V illustrates the results obtained.

TABLE V

| Cure Days at 73° F., 50% RH | Load, Lbs. | Stress, P.S.I. | Tensile Bead Failure, % |
|---|---|---|---|
| 3 | 3500 | 408 | 100 Bond |
| 3 | 3500 | 408 | 100 Bond |
| 3 | 3220 | 375 | 100 Bond |
| 10 | 4060 | 473 | 100 Block |
| 10 | 4060 | 473 | 100 Block |
| 10 | 3920 | 457 | 100 Block |

EXAMPLE 6

To 2076 grams of portland cement was added, by blending with a spatula, 472 grams of the epoxy resin of Example 1. The mix was then transferred to a compounding roll and thoroughly blended under conditions of high shear. More particularly, the mix was compounded on a Stewart Boiling Compounding Mill having rolls 6 inches in diameter and 13 inches in length with the front roll having a clockwise rotation of 6 revolutions per 63.2 seconds and a back roll having a counter clockwise rotation of 24 revolutions per 65 seconds. The rolls were maintained at a temperature of about 25° C. To this mix was then added 24 grams of dibutyl phthalate with sufficient acetone to obtain a working consistency. After about one hour the mixture (Mixture 1) was admixed with a blend (Mixture 2) of about 1140 grams of the latex of Example 1 and about 320 grams of the curing agent of Example 1 dissolved in about 320 grams of methyl alcohol.

The resulting blend of mixtures 1 and 2 was tested as per Example 2 and produced results essentially equivalent to those results set forth in Table II. The blend described herein, however, was characterized by an exceptionally smooth consistency with accompanying enhanced ease of application to the concrete blocks.

The two-package binder compositions as specified in Example 6 have also been shown to be particularly useful in the preparation of head joints in concrete block construction due to the ability of such blends to maintain integrity as a bond even when the blocks are bumped or moved. It is believed that the high-shear mixing of the cement-resin component (Mixture 1) produces such a fine dispersion of cement particles in the final mix that the flow characteristics of this mix are vastly changed from the prior known four-component product.

The improved working life, i.e. the ability of the binder composition of the present invention to maintain a smooth, creamy consistency over extended periods of time, is illustrated in FIG. No. 1. More particularly, in such figure, curve A sets forth the flow characteristics of the binder composition specifically described in Example 6, as determined by a Brabender Visco-Corder using a small spindle at 25 RPM in conjunction with a 500 cm spring. Comparative data is also provided in such figure (Curve B) utilizing a composition composed of the same amounts and types of portland cement, epoxy resin, latex and resin curing agent (absent the methanol), which composition was prepared by the teaching of USP Pat. No. 3,240,736, i.e. by admixture of (a) cement, latex and water and a separate mixture of (b) resin and curing agent.

The scale readings from the Visco-Corder are plotted versus time in FIG. No. 1, showing the relative behavior of the binder compositions. In both instances the "spread" of the data is shown, a thin line indicating a smooth, creamy consistency and a broad band indicating a thicker, more crumbly material. The slope and spread of the curve for the comparative composition (Curve B), as illustrated in FIG. No. 1, indicates that the effective "working-life" of such composition is about 30 minutes (where significant thickening occurs) with such material becoming excessively "crumbly" or "cheesy" and wet on the surface at this time. On the other hand, the slope and spread of the curve for the binder composition prepared as prescribed by the present invention (Curve A), indicates an effective working-life of about 80 minutes while maintaining a smooth, creamy consistency.

What is claimed is:

1. A process for providing improved head joints in concrete block construction comprising utilizing as the adhesive in the preparation of said head joints a plastic, aqueous binder composition comprising a mixture of the following in parts by weight of solids; from about 20 to about 85 hydraulic cement; from about 2 to about 25 of a styrene-butadiene polymeric latex, said latex being a plasticizer for the composition; from about 10 to 50 liquid synthetic thermosetting ambient temperature curable epoxide resin and a fat acid polyamide curing agent having an amine value of 290–320 therefor wherein the resin is from about 60 to about 95 percent by weight and the curing agent is the remainder; together with water for curing said cement, wherein said binder composition is prepared by
    1. preparing a first mixture comprising a blend of said cement and said epoxide resin wherein said first mixture is subjected to mixing on a compounding mill under conditions of high shear,
    2. preparing a second mixture comprising a blend of said polymeric latex with said curing agent wherein said curing agent is dissolved in methyl alcohol, and
    3. admixing said first mixture and said second mixture prior to use as an adhesive.

2. The process of claim 1 wherein said curable epoxide resin comprises 100 parts of a diglycidyl ether of a polyhydric alcohol having an equivalent weight of from about 232 to 250.

3. The process of claim 2 wherein said curable epoxide resin is admixed with up to about 20 parts of the plasticizer dibutyl phthalate and wherein said epoxide resin and said plasticizer are dissolved in acetone.

* * * * *

UNITED STATES PATENT OFFICE
CERTIFICATE OF CORRECTION

Patent No. 4,048,000   Dated Sept. 13, 1977

Inventor(s) Elmer L. McMaster et al

It is certified that error appears in the above-identified patent and that said Letters Patent are hereby corrected as shown below:

On the first page, in the second line of the title, the word "POINTS" should be --JOINTS--.

Column 1, in the second line of the title, change "POINTS" to --JOINTS--.

Column 5, line 32, insert quotation marks around the words working-life so that it reads "working-life".

Signed and Sealed this

Fourteenth Day of February 1978

[SEAL]

Attest:

RUTH C. MASON
*Attesting Officer*

LUTRELLE F. PARKER
*Acting Commissioner of Patents and Trademarks*